UNITED STATES PATENT OFFICE.

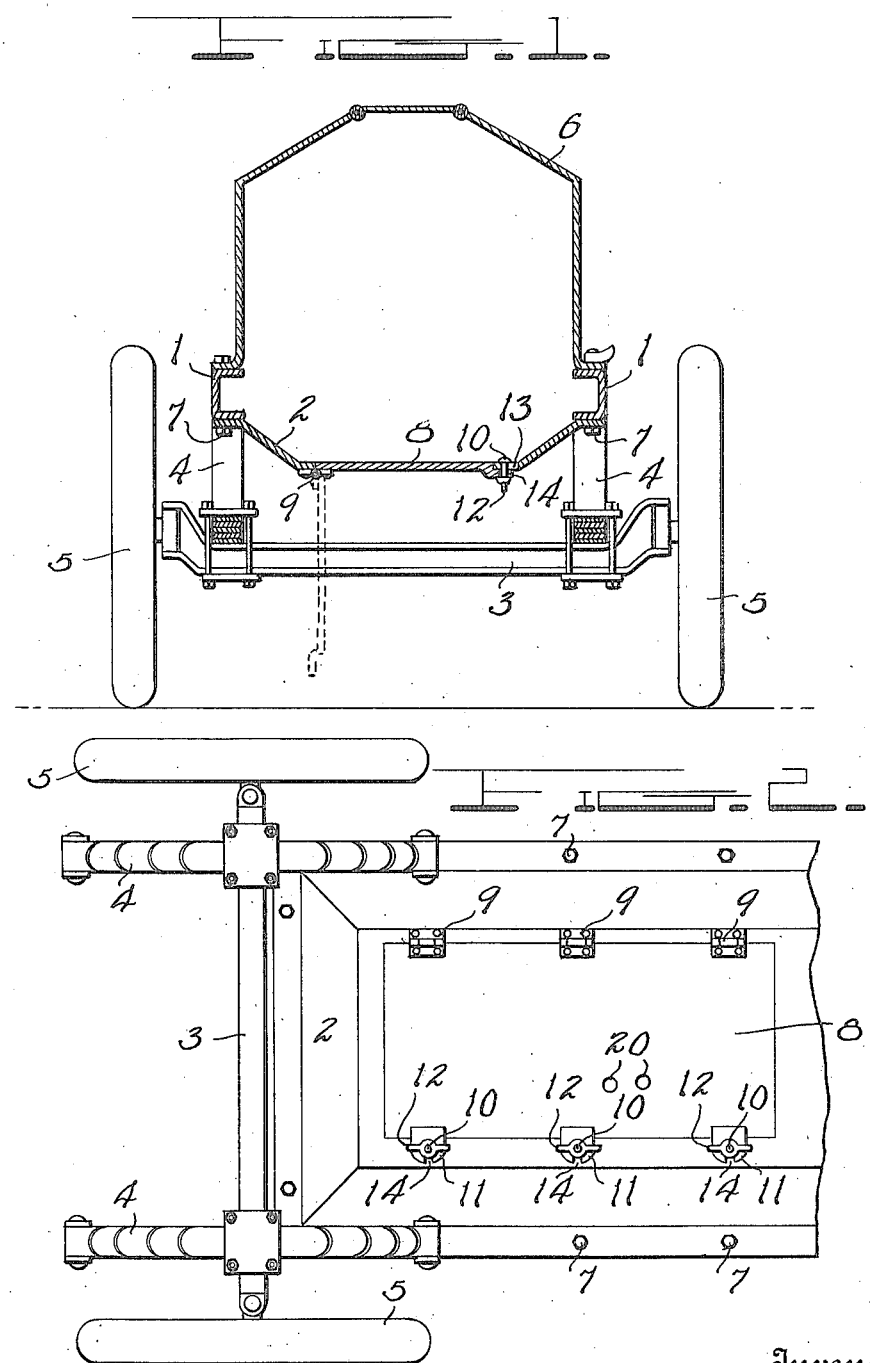

JAMES M. EDGINGTON AND ARTHUR C. EDGINGTON, OF CHILLICOTHE, OHIO.

UNDERPAN CONSTRUCTION FOR AUTOMOBILES.

1,213,848.  
Specification of Letters Patent.  
Patented Jan. 30, 1917.

Application filed March 31, 1915. Serial No. 18,393.

*To all whom it may concern:*

Be it known that we, JAMES M. EDGINGTON and ARTHUR C. EDGINGTON, both citizens of the United States, residing at Chillicothe, in the county of Ross and State of Ohio, have invented certain new and useful Improvements in Underpan Constructions for Automobiles, of which the following is a specification.

The present invention relates to an under pan for automobiles, and has for its object to provide a device of this character which embodies novel features of construction whereby it can be readily opened up from the bottom for the purpose of recovering a lost tool or for cleaning the same without the necessity of removing the under pan or removing the permanent fastenings thereof.

Further objects of the invention are to provide an under pan for automobiles which is comparatively simple and inexpensive in its construction, which can be advantageously used in connection with any of the standard constructions of automobiles, which can be easily and quickly opened up from the bottom to recover a lost article or remove accumulations of grease and dirt from the pan, and which comprises a strong and durable construction such as is not liable to get out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a transverse sectional view through the forward end of an automobile chassis provided with an under pan constructed in accordance with the invention, the trap door of the under pan being shown in a closed position by full lines and in an open position by dotted lines. Fig. 2 is a bottom plan view of the forward end of an automobile chassis provided with an under pan embodying the invention.

Corresponding and like parts are referred to in the following description and indicated in all the views of the drawing by the same reference characters.

For the purpose of illustration, the invention is illustrated as applied to an automobile chassis of the conventional construction. The numerals 1 designate the side bars of the main frame to which the edges of the under pan 2 are secured. The forward end of the main frame is mounted upon the front axle 3 through the medium of the usual springs 4. Front wheels 5 are mounted upon the ends of the front axle 3 in the usual manner, while the conventional engine hood is indicated at 6.

The under pan 2 is adapted to extend under the engine in the usual manner and the edges thereof may be permanently fastened to the main frame by suitable members such as the bolts 7. The portion of the under pan 2 which is disposed under the engine is formed with a large opening which is normally closed by a downwardly swinging trap door 8. One side of the said trap door is connected to the under pan at the edge of the opening therein by suitable hinge members 9, while clamping bolts 10 or other suitable fastening members engage wings 11 projecting from the swinging edge of the trap door for the purpose of locking the trap door in a closed position. These clamping bolts 10 are provided with the wing nuts 12 and operate within slots 13 in the under pan 2 and corresponding slots 14 in the wings 11. When it is desired to open the trap door the wing nuts 12 are loosened and the clamping bolts 10 moved laterally within the slots 13 until they are completely disengaged from the slots 14 of the wings 11. The trap door 8 will then drop downwardly by the action of gravity into the position indicated by dotted lines on Fig. 1. A workman can then obtain access to the crank case of the engine for the purpose of tightening up loose rods, bearings, or the like. The provision of this trap door in the under pan also has the advantage of providing for the quick recovery of a small tool, nut, or bolt which may have been accidentally dropped into the under pan and found its way under the engine. Accumulations of grease and mud can also be very quickly removed without the necessity of removing or loosening any of the permanent fastenings of the under pan. It is merely necessary to drop the trap door and permit the accumulations of grease and dirt to run out, which they will do in a very few minutes. The trap door 8 is preferably provided with openings 20 through which any overflow of gasolene from the carbureter can run out.

Having thus described the invention, what we claim as new and desire to secure by Letters Patent, is:—

1. An under pan construction for automobiles, including a pan extending under the engine and having the edges thereof permanently secured to the chassis, said pan being provided at a point under the engine with a large opening, a downwardly swinging trap door normally closing the opening and hinged at one of its edges to one side of the opening, and fastening members adjustably mounted upon the pan at the opposite side of the opening for detachably engaging the swinging edge of the trap door to lock the trap door in a closed position, said fastening members being movable into an inoperative position when it is desired to open the trap door.

2. An under pan construction for automobiles, including a pan extending under the engine and permanently secured to the chassis, said pan being provided at a point under the engine with a large opening, a downwardly swinging trap door normally closing the opening and hinged at one edge thereof to one side of the opening, slots being provided in the pan at the opposite side of the opening, wings projecting from the swinging edge of the trap door and provided with notches, and clamping bolts slidable within the slots of the pan and adapted to be moved into and out of engagement with the notched wings at the swinging edge of the trap door so that the trap door can be locked in a closed position and quickly released.

3. An under pan construction for automobiles, including a pan extending under the engine and having the edges thereof permanently secured to the chassis, said pan being provided at a point under the engine with a large opening, and the sides of the pan sloping downwardly toward the said opening, a downwardly swinging trap door normally closing the opening and hinged at one of its edges to one side of the opening, and fastening means for locking the trap door in a closed position.

In testimony whereof we affix our signatures in presence of two witnesses.

JAMES M. EDGINGTON.
ARTHUR C. EDGINGTON.

Witnesses:
E. MEGGENHOFEN,
LOUIS M. DAY.